US 7,740,281 B2

(12) United States Patent
Gaffney et al.

(10) Patent No.: US 7,740,281 B2
(45) Date of Patent: Jun. 22, 2010

(54) METHOD AND SYSTEM FOR PRODUCING CERTIFIED DOCUMENTS AND THE LIKE

(75) Inventors: Gene F Gaffney, Wantagh, NY (US); William R O'Brien, Queens Village, NY (US)

(73) Assignee: The Ergonomic Group, Westbury, NY (US)

( * ) Notice: Subject to any disclaimer, the term of this patent is extended or adjusted under 35 U.S.C. 154(b) by 207 days.

(21) Appl. No.: 11/678,318

(22) Filed: Feb. 23, 2007

(65) Prior Publication Data
US 2008/0179876 A1 Jul. 31, 2008

Related U.S. Application Data

(60) Provisional application No. 60/887,439, filed on Jan. 31, 2007.

(51) Int. Cl.
*B42D 15/00* (2006.01)
*G09C 3/00* (2006.01)
*G09C 5/00* (2006.01)
*B41K 3/38* (2006.01)
*G06F 21/00* (2006.01)

(52) U.S. Cl. .............................. 283/72; 283/67; 283/73; 283/74; 283/98; 283/117; 283/901; 380/55; 380/59; 705/50

(58) Field of Classification Search .................. 283/72, 283/74, 113; 380/200, 201, 202; 705/50, 705/51, 57, 58, 76; 713/182; 726/16, 17; 382/232, 233, 234, 235, 236, 237, 238, 239; *B42D 15/00; G06F 7/04, 7/58, 12/00, 12/14, 13/00, 17/30; G06K 19/ 00; G11C 7/00; H04K 1/00; H04L 9/00, H04L 9/32*
See application file for complete search history.

(56) References Cited

U.S. PATENT DOCUMENTS 5,018,767 A 5/1991 Wicker (Continued)

FOREIGN PATENT DOCUMENTS

CN 1830692 A 9/2006

(Continued)

OTHER PUBLICATIONS

Dan Margulis, 15th Chapter, "Resolving the Resolution Issue"; pp. 295-320; http://www.ledet.com/margulis/PP7_Ch15_Resolution. pdf.

(Continued)

*Primary Examiner*—Dana Ross
*Assistant Examiner*—Justin V Lewis
(74) *Attorney, Agent, or Firm*—Gottlieb, Rackman & Reisman, P.C.

(57) ABSTRACT

A system for generating secure documents includes a station for generating a plain document and a security image generator that generates a security image. The security image is then incorporated into the plain document. Each security image consists of a plurality of secure elements, each secure element being defined by two sets of parallel lines. Each secure element defines an alphanumeric character or other unique image that is visible under certain conditions, i.e., when inspected through a viewer. The technique can also be used to provide security images on a web page as a means of indicating that the web page is genuine.

26 Claims, 6 Drawing Sheets

U.S. PATENT DOCUMENTS

| | | | |
|---|---|---|---|
| 5,074,596 | A | 12/1991 | Castagnoli |
| 5,153,936 | A | 10/1992 | Morris et al. |
| 5,454,598 | A | 10/1995 | Wicker |
| 5,661,289 | A * | 8/1997 | Sasou et al. ............... 235/449 |
| 5,707,083 | A | 1/1998 | Wallace |
| 5,722,693 | A | 3/1998 | Wicker |
| 5,735,547 | A | 4/1998 | Morelle et al. |
| 5,788,285 | A | 8/1998 | Wicker |
| 7,025,269 | B2 * | 4/2006 | Marshall ............... 235/462.01 |
| 7,080,041 | B2 | 7/2006 | Nagel |
| 2003/0030271 | A1 | 2/2003 | Wicker |
| 2004/0182923 | A1 | 9/2004 | Bench et al. |
| 2005/0225080 | A1 | 10/2005 | Wicker |
| 2006/0067593 | A1 * | 3/2006 | Erol et al. ............... 382/309 |
| 2006/0206717 | A1 * | 9/2006 | Holt et al. ............... 713/182 |
| 2006/0289661 | A1 * | 12/2006 | Bian ............... 235/494 |

FOREIGN PATENT DOCUMENTS

| | | |
|---|---|---|
| EP | 1137252 A | 9/2001 |
| GB | 2018197 A | 10/1979 |
| WO | 9008046 | 7/1990 |
| WO | 2004033229 | 4/2004 |
| WO | 2004068421 | 8/2004 |
| WO | 2006001793 | 1/2006 |
| WO | 2006048368 A | 5/2006 |

OTHER PUBLICATIONS

W.A. Fisher Advertising & Printing "Tips for Creating Your Own Digital Files to be Used in High-Quality Offset Printing", REV: 200308.

Adobe Systems Incorporated; Scanning Basics—Support Knowledge, (c) 2006; http://www.adobe.com/support/techdocs/311216.html.

Summit Printing from Appleton Papers, "A Guide to Document Security" http://www.summitprinting.com/security.htm.

David Creamer, I.D.E.A.S. Publishing Consultant & Trainer; (c) 2006; http://www.ideastraining.com/PDFs/UnderstandingResolution.pdf.

* cited by examiner (each letter)

GF1

GF2

TA

TF1

| TF2 | DF1 | B1 |
| TF3 | DF2 | B2 |
| TF4 | DF3 | B3 |

SCF

300

METHOD AND SYSTEM FOR PRODUCING CERTIFIED DOCUMENTS AND THE LIKE

RELATED APPLICATIONS

This application claims priority to U.S. Provisional application Ser. No. 60/887,439 filed Jan. 31, 2007 and incorporated herein by reference in its entirety.

BACKGROUND OF THE INVENTION

A. Field of Invention

This invention pertains to a system for producing certified documents electronically, and more particularly, to documents that have a security image with information that is not visible to the naked eye, thus providing a certification that the document is genuine. The method is also used to generate web pages with a similar security as a means of providing verification that the web pages are genuine. More particularly, a method and system is provided wherein a string of alphanumeric characters are converted into a security image from several security elements, each element corresponding to each of the characters of the string. The string may be defined by a customer and may be different for each document, or it may be a standard string that is used for a number of documents or web pages.

B. Description of the Prior Art

The security of documents has been a long time concern, particularly for governmental agencies and financial institutions. In order to provide assurance that a document is genuine, documents have been printed on special paper having special characteristics. For example, it is very common to provide official documents, including bank notes and financial instruments on paper that is embossed and/or imprinted with a fine design that is difficult to reproduce or copy. Moreover, some of the patterns imprinted on the paper are constructed and arranged to be almost invisible to the naked eye on an original document but produce a very clear mark when reproduced on a copier, thereby indicating that a corresponding document is not genuine but has been copied. Various techniques for generating these types of documents have been developed, for example, by Document Security Systems, Inc. of Rochester, N.Y.

However, these types of documents are created using specialized expensive printers to either create the whole document in one step, or to create the documents in two steps, first by imprinting or embossing blank pages with a security image or watermark, and second, by applying content to the pages. In either case, the process is slow and time consuming. Moreover the process is very expensive if it is used to produce a single, unique document that may be used, for example, for identification.

SUMMARY OF THE INVENTION

The present invention pertains to a method and system for adding a security image to a document electronically. Imbedded in the security image is a string of alphanumeric characters used to verify the authenticity of the document. Additional graphic elements can also be added to the string, if desired. The security image is structured and arranged so that when the document is viewed normally on a monitor or when the document is reproduced on a standard printer, the string is substantially invisible to the naked eye. The system further includes means for viewing the security image to read the string.

DESCRIPTION OF THE INVENTION

In one aspect of the present invention the present application pertains to a method and system for providing a unique security image that is incorporated or imbedded electronically into a document.

As discussed above, prior art techniques are known in which a imprinted paper is used for a document, the imprinted paper being preprinted on special printing presses with a security feature. The security feature is generated of line patterns, including two sets of parallel lines disposed at a respective predetermined angle. The line patterns have characteristics selected so that when the document (or the imprinted paper) is copied on a standard copying machine, a preselected image and/or a string of alphanumeric characters appear on the copy. Alternatively, a special viewer formed of a piece of transparent material with a silk-screened line pattern is used to view the original document. However this technique cannot be used to generate documents electronically.

According to the present invention, a document with a security image is generated as follows. First, a set of security elements is generated, each element corresponding to a graphic element such as an alphanumeric character. If necessary, other security elements may be incorporated into the set, such as elements representing the image of a face, or various other articles. Each security element is generated using at least two sets of parallel lines disposed at a predetermined angle and having a predetermined line density.

In the prior art techniques described above, a security feature was generated using line densities ranging from 100 LPI (lines per inch) up to 300 LPI or more, with 133 LPI being typical. However, the present inventors have found that this range is not particularly suited for electronically produced documents. For example, if a document is created with a security image having this density and then printed on a 600 DPI printer, then printer must generate a line every 600/133=4.5112 dots. However, a standard printer can not print a half a dot and therefore the line density used for imprinted documents are not suitable for electronically generated transmitted documents. The present inventors have determined that instead of 133 LPI, 75 LPI is more suitable. Then, a 600 DPI printer can make the required lines easily. For example, a typical line pattern may be generated by printing a line one dot wide separated by the next line by a space equal to the width of several lines. For a 1200 DPI printer, the line density can be increased to 150 LPI.

Figure 1A:
FIGS. 1A-1D show the process used to generate a security image according to this invention.
Figure 1B:
Figure 1B:

A technique for generating security elements is now described. The security elements are generated electronically using a graphic program such as Photoshop, Gimp, etc. First a blank canvas is selected having a predetermined size. The canvas is then filled with a first set of parallel lines disposed at a first angle, as shown in FIG. 1A. In this figure the first line pattern has an angle of 45° forming the background for the canvas. Next, an alphanumeric letter is selected for which a security element is required. The letter has a predetermined font and can be an upper case or a lower case letter. The letter is filled with a second set of lines having a predetermined angle with the first set of lines. For example, the second set of lines may be perpendicular to the first set. In FIG. 1B, a capital G is shown filled with a second set of lines perpendicular to the first set. (In FIG. 1B, the canvas with the first set of lines is repeated for the sake of clarity). Preferably, the two sets of lines have substantially, the same characteristics (except for the angle). For example, both set of lines may be 1 dot (or pixel, as seen on a screen) wide and separated by 7 dots (or pixels).

Figure 1C:
Figure 1C:
Figure 1C:
Figure 1C:
Figure 1C:
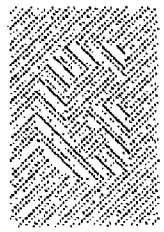
Figure 1D:
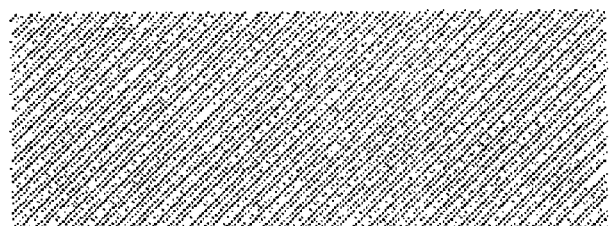
Figure 1D:
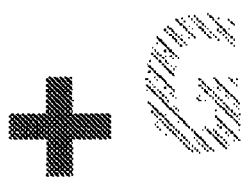
Figure 1D:
Figure 1D:
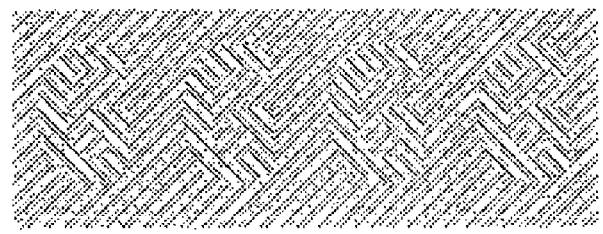

Next, the alphanumeric character (in this case, G) is merged or combined with the background canvas. Preferably during this step, the interface between the letter and the canvas is inspected and one or both sets of lines are moved either up or down or laterally to insure that most of the lines of one set do not merely terminate at the interface between the letter and the background but that they are connected to respective lines of the second set. This process insures that the respective letter is difficult to see in the resulting security element (as shown on the right side of FIG. 1C). (It should be understood that throughout FIGS. 1A-1D the thickness and density of the lines are exaggerated for illustration purposes.)

This process is repeated for every alphanumeric character desired, including the letters of the alphabet, numbers 1-9 as well as for any other types of images, such as a $ and other symbols. Once a whole set of security elements is generated in this manner, any string of characters can be converted into a corresponding security image by combining the security elements corresponding the characters in the string.

Once the set of security elements are formed, they can be used in a number of different ways in a number of different systems.

An author generating a document using any standard application, such as a word processor, a spreadsheet, etc., may decide that at least some information on the document should be hidden from plain view or verified. For example, he may want to provide a verification that a commercial instrument has a face value of $10,000.00. Other such information may include serial numbers, passwords, secret information, etc. Therefore, one portion of the document may indicate in plain text the face value. To generate the other portion, he access the data base, either directly, or via a web page and request the composite images for the that amount. The composite images are imbedded into the document as a watermark, background or an imbedded image as described.

Figure 2:
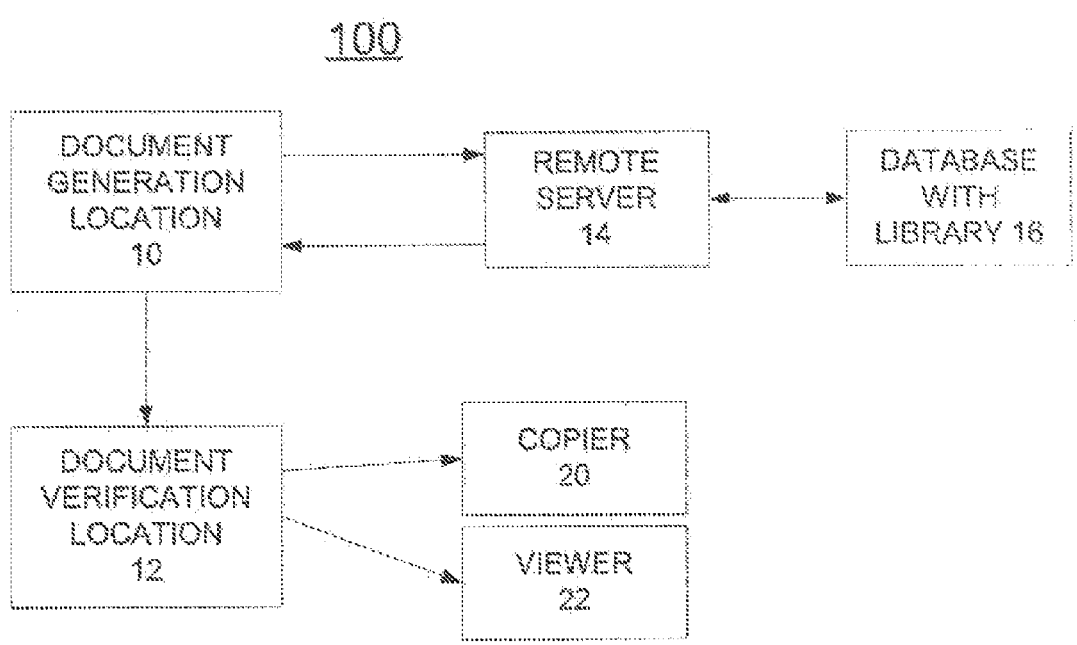
FIG. 2 shows a system for incorporating security images into documents in accordance with the embodiment of the invention.

FIG. 2 shows a first system for generating documents using security images generates as described above. The system 100 in this Figure includes a document generation location 10 and a remote server 14. Server 14 is associated with a data base 16 with a library of security elements generated as described above, and in FIGS. 1A-1D.

Figure 3A:
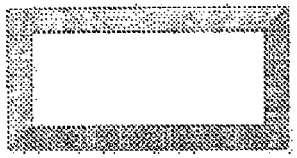
FIGS. 3A-3C show how a document is modified by adding security images in accordance with this invention.
Figure 3A:
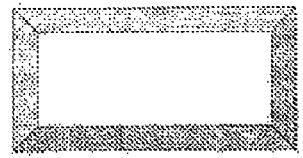
Figure 3A:
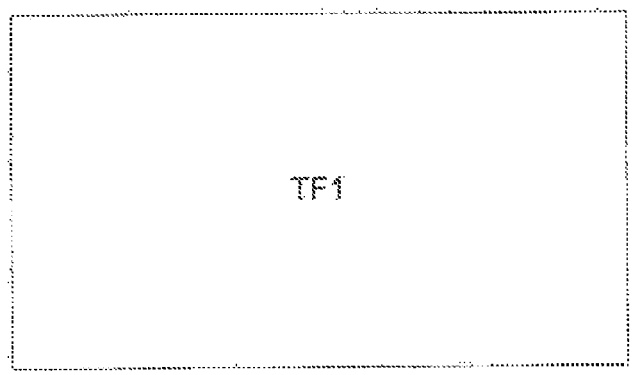
Figure 3A:
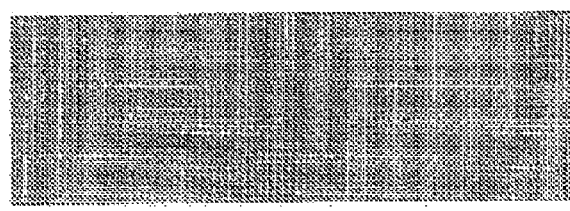

The system 100 further includes a document verification location 12 used for verifying that any received document is genuine and has been generated by, or at the document generation location 10. The operation of system 10 is now described in conjunction with FIGS. 2, 3A-3C and FIG. 4. The process starts with the generation of a standard or plain document 300, as indicated in Step 402 in FIG. 4 at the form generation location 10. An example of such a document 300 is shown in FIG. 3A and it includes several fixed text fields such as TF1, TF2, TF3, TF4 with various text, a title area TA identifying the document and/or the issuing authority, one or more graphic fields GF1, GF2 with pictures or other graphic elements and a security code field SCF, such as a bar code. Document 300 may be generated by using a template with these fields already populated, or each of these fields may be added on the fly. Any of the fields described so far may have static content that is predetermined or may have dynamic content that is provided when the document is generated. In addition, the document 300 also includes several data fields DF1, DF2, DF3 that include entered by an operator. These fields may define one or more dates, monetary amounts and/or other quantities, serial numbers, security codes, etc. Finally, the document has several fields B1, B2, B3 reserved for corresponding security images corresponding to the data in data fields DF1-DF3. Preferably, these fields are disposed adjacent to the respective data fields, but can be placed anywhere on the document.

The document 300 may be a certificate of citizenship, a license, etc. The document 300 can be generated on a data processing device such as a computer using standard software applications such as Microsoft Word, Microsoft Excell, Adobe Acrobat, etc.

In step 404 the generated document is sent to the remote server 14. The remote server identifies the data fields DF1-DF3 that require to be translated into corresponding images. This step can be performed by designating ahead of time the location of the data fields, by sending a separate data file indicating the content of the data fields or any other means. The data in these fields is in the form of an alphanumeric string. In step 408, the server accesses the library 16 and for each element of each string, it retrieves the corresponding security element. In step 410 the retrieved elements are arranged in sequence. In step 412 the size of the resulting security image is compared to the size of the respective B1-B3. If the security image does not fit the size of the respective field, each field may be resized as required.

Figure 3B:
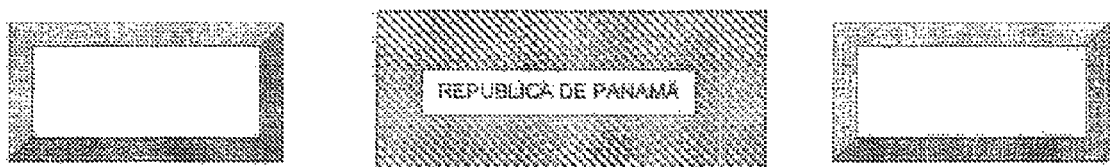
Figure 3B:
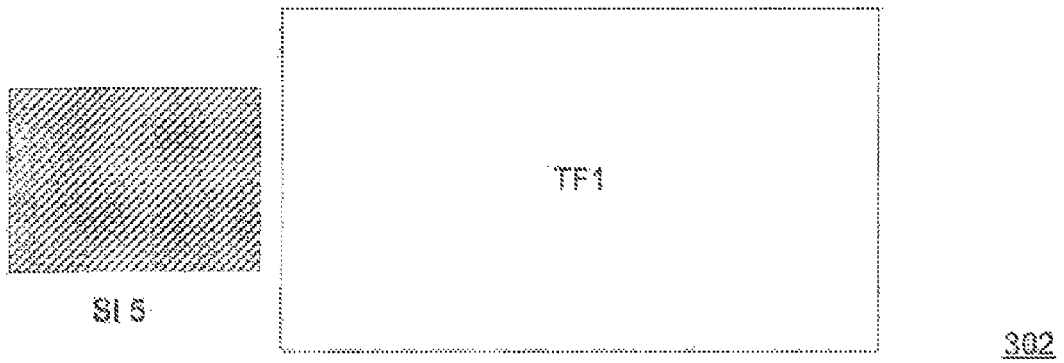
Figure 3B:
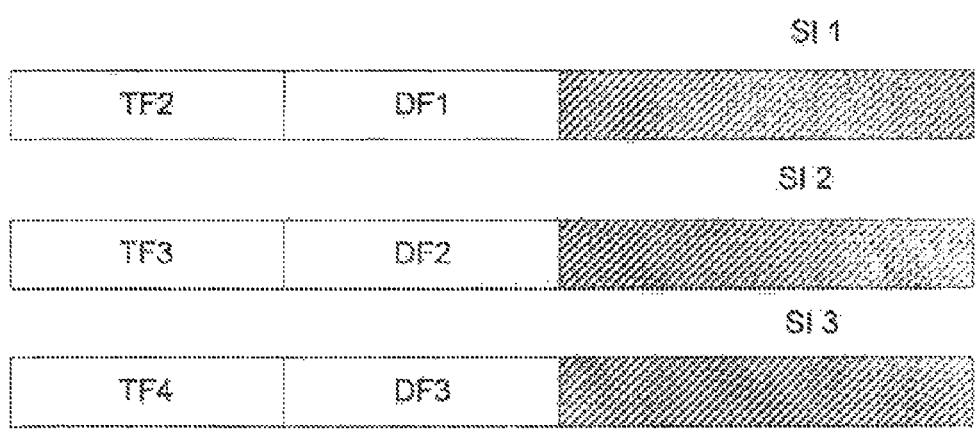
Figure 3B:
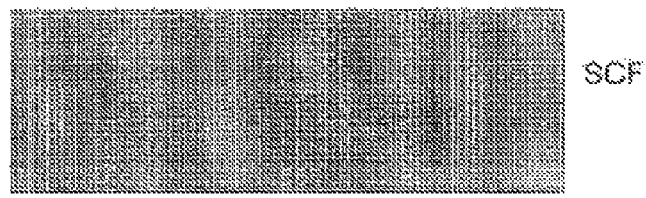
Figure 4:
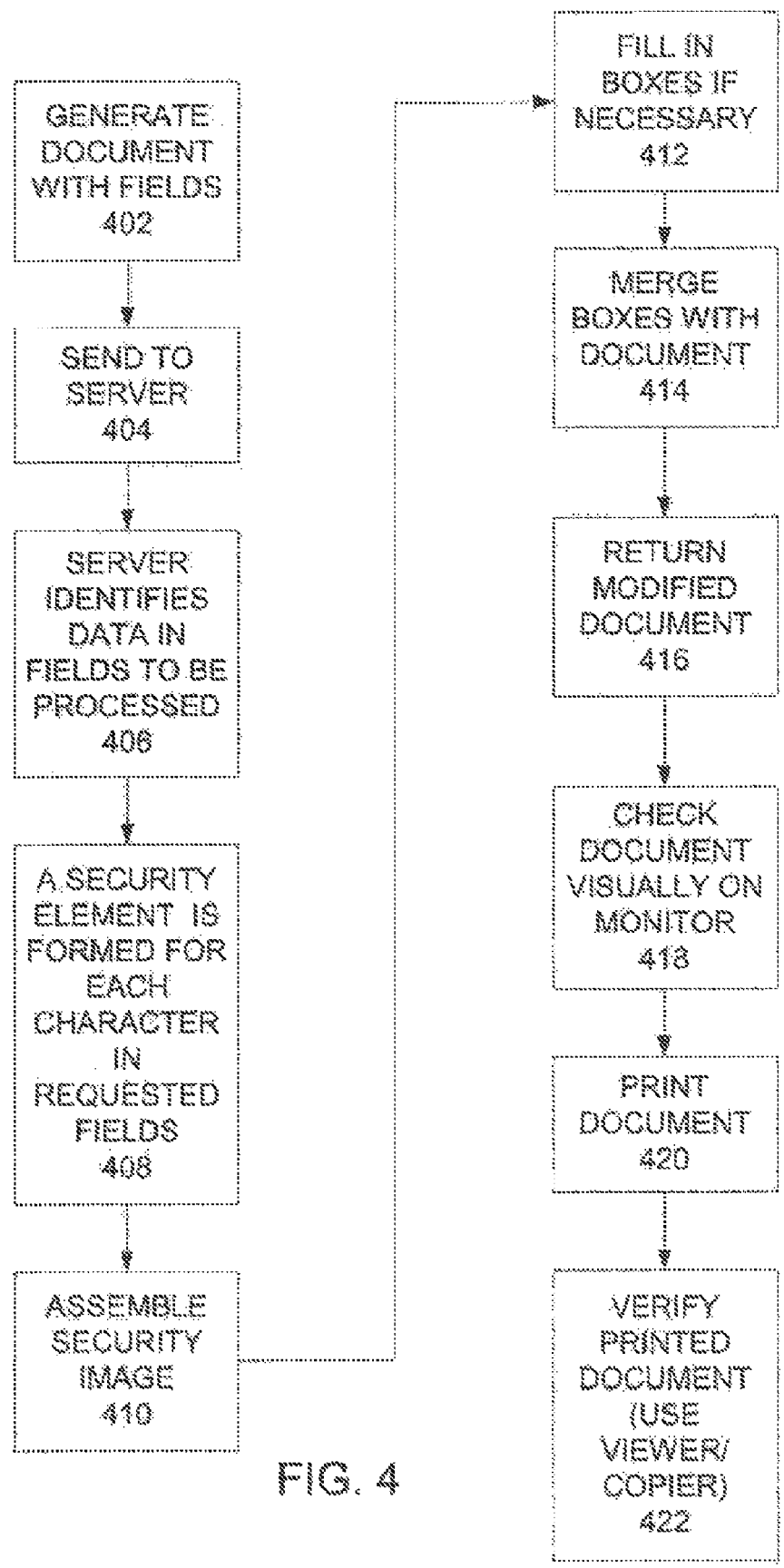
FIG. 4 shows a flow chart for generating security images and merging them with documents.

In step 414 the security images are merged with the original document by replacing or overwriting the fields B1-B3 with the respective security images SI1-SI. The modified document 302 is shown in FIG. 3B. The modified document 302 is then returned to the location 12 (step 416). At the location, the modified document may be checked visually on a monitor (not shown) in step 418. Of course, typical monitors generate images at a resolution of 72 pixels per inch (PPI) and therefore the security image will show up on the monitor as merely some blur lines. The actual alphanumeric characters embedded therein may be visible by increasing the resolution of the monitor to about 130 PPI.

Next, the modified document is printed (step 420) using any standard printer (not shown). The printed document, looks like what is shown in FIG. 3B.

The document can be authenticated or its contents may be verified at a location 12 in two ways. First, the document can be viewed through a piece of transparent material on which lines having a density matching the density of lines making up the security images. When the security images are viewed in this manner, the alphanumeric characters become clearly visible. Alternatively, the characters may become readable when the document is photocopied.

Figure 3C:
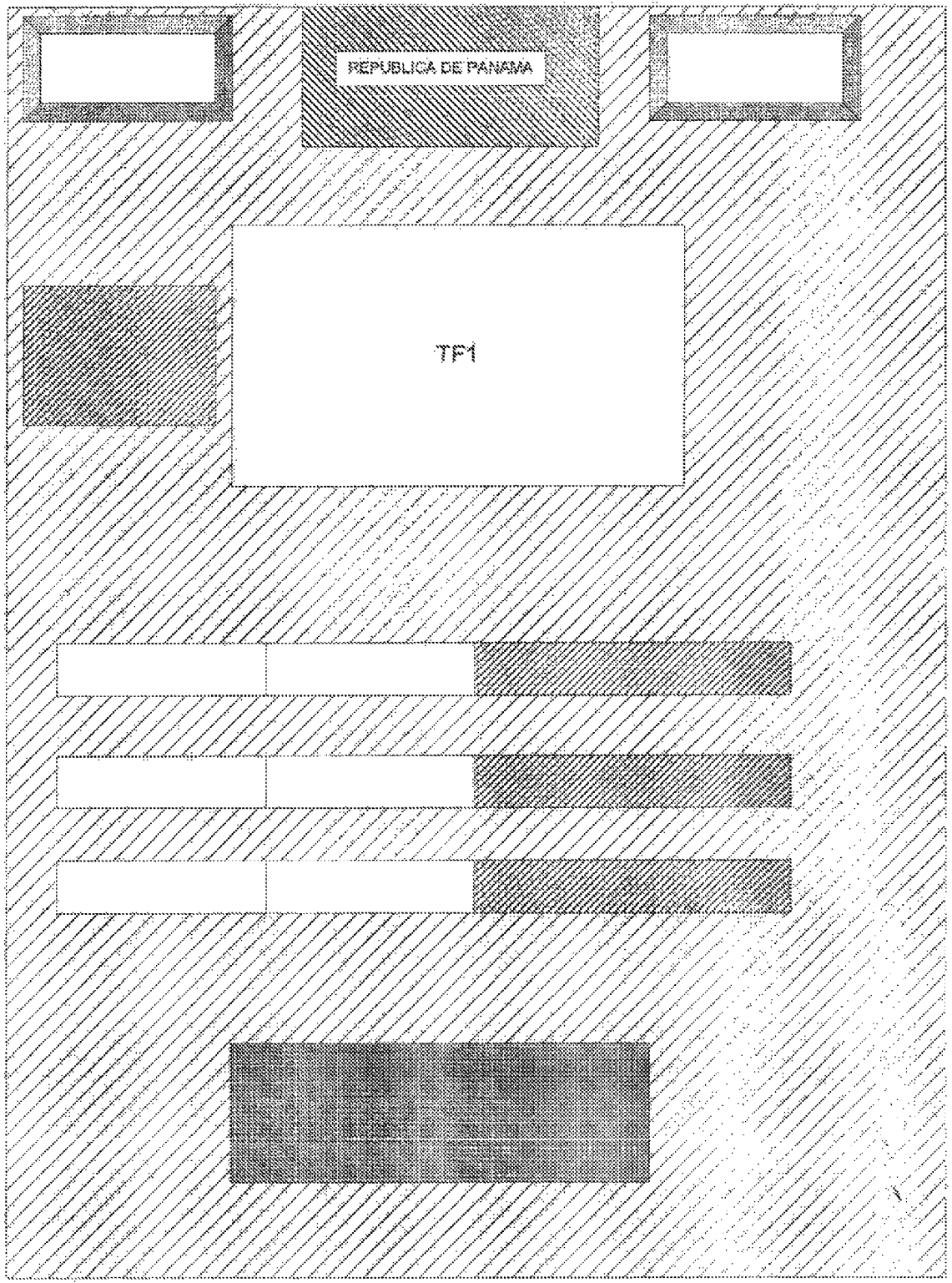

Of course, different security images may be provided on other portions of the document. For example, as shown in FIG. 3B, the document can include a security image SI4 behind the title field (e.g., the security image becomes a background for the title field) and/or a security image SI5 can be positioned at any other location on the document. Moreover, a security image SI6 can be provided as a background or watermark for substantially the whole document as shown in FIG. 3C.

The security images SI4-SI6 can consist of fixed characters (identifying, for example, the name of the authority issuing the document) that are the same for all the documents, or variables that are different for different users, different class of customers, etc. All the images S4-S6 are generated using any of the processes described herein.

In the embodiment described, document 300 is first generated, sent to the server, the security images are generated, merged into the document, and the modified document is then returned to the location 10. In an alternate embodiment, instead of sending the whole document, the station 10 sends to the server only the data fields requiring corresponding security images. In this case, the server returns the security images and the images are merged into the document at location 10.

In another embodiment, the server 10 is eliminated altogether. In this embodiment, the library of security elements is provided directly to the location 10. At this location, an author can have security images from a data base and then assemble the security images as discussed above.

In another embodiment of the invention, the same process described above is used to protect, verify or otherwise authenticate a web page. In this embodiment, a plain web page is generated and a security image generated as discussed above is merged with the plain web page to form a modified web page. As in the previous embodiments, the security image contains a string of alphanumeric characters. A user can determine whether he is looking at a webpage thus modified is genuine or not by printing the webpage or any other documents associated therewith. The printed document includes the security image and can be checked for authenticity by using a viewer or by photocopying as described above. Alternatively data imbedded in the security image can be extracted using the same techniques.

Some applications, such as webpages cannot use the composite images in the formats and sizes in which they are stored. For these situations, in order to display a security image in a browser, a webpage designer needs to know the size of each security image. In the example given above, if the security image is opened in a browser in its default size, it may be too to small or too large to see and print properly. In these cases, the developer needs to set the width and height of the security image on the monitor to scale the image. The image may look distorted on the display (similar to what is shown in FIG. 2B), but it may print perfectly.

In another embodiment, after the security elements are created they must be imported into a secure database, to keep people from grabbing them and playing or altering them. The elements are stored in a database as binary format, to be retrieved when needed.

A client will have a dedicated real-time service that will provide an output to a design and format that the client has agreed upon. This output will have both secure and unsecure data. The client's request will be sent to the service that will print out their document. When the data is being compiled for printing, the process will take the security fields and will replace them with the security images, meaning that each security field will be parsed letter by letter and the service will replace each letter with the appropriate security image at a specific size (height and width) to get the best result.

Then the output will display the data requested along with the security images. Upon printing of this output, the security images will display their true form. After the printing has finished, the documents can be checked using the viewer and the text imbedded in the security images can be read.

Numerous modifications can be made to this invention without departing from its scope as defined in the appended claims.

We claim:

1. A system for generating documents electronically comprising:
    a document generator generating electronically a plain document including a sequence of adjacent graphic elements; and
    a security image generator generating a security image including a plurality of discrete security elements arranged adjacent to each other, each security element being formed of at least two sets of parallel lines and corresponding to a respective graphic element of said sequence, wherein said sets of lines are not parallel to each other; and
    a modified document generator generating a modified document by merging said security image with said plain document by replacing said sequence of adjacent graphic elements with said security image.

2. The system of claim 1 further comprising a library for said security elements, said security image generator accessing said library and selecting the security element corresponding to each graphic element to generate said security image.

3. The system of claim 1 further comprising a server remotely located from said document generator, said security image generator being incorporated in said server.

4. The system of claim 1 wherein said graphic elements consist of alphanumeric characters, said system further comprising a verification station for detecting the alphanumeric characters in the security image.

5. The system of claim 1 wherein said at least one of said graphic element is an alphanumeric character.

6. The system of claim 1 wherein said plain document includes data and wherein said security image includes security elements with a data string of alphanumeric characters corresponding to said data.

7. A method of generating a security image electronically comprising:
    receiving a request for a security image corresponding to a sequence of adjacent graphic elements; and
    generating automatically said security image by assembling a plurality of security elements, each security element being formed of a first set and a second set of lines, each security element corresponding to one of said graphic elements, wherein each set of lines consists of a set of parallel ones disposed adjacent to each other and wherein the lines of the first set are not parallel to the lines of the second set.

8. The method of claim 7 wherein the security elements of said security image define a predetermined string of alphanumeric characters corresponding to said graphic elements.

9. The method of claim 7 further comprising receiving a plain document including data with said sequence of adjacent graphic elements, wherein said data is specific to said plain document.

10. The method of claim 9 wherein said plain document includes a data field containing said data.

11. The method of claim 7 further comprising generating a plain document with a data field remotely and transmitting data from said data field to a security image generator for generating said security image.

12. The method of claim 7 wherein said step of generating includes retrieving each security element from a security element library.

13. A method of generating a plurality of security elements comprising:
    defining a canvas of predetermined size;
    filling said canvas with a first set of adjacent parallel lines;

forming a graphic image using a second set of adjacent parallel lines that are not parallel to said first set and joining said first and second set of parallel lines to form a predetermined security image; wherein said first and second parallel lines have a first set of physical characteristics selected to render said security image visible only when viewed through a special viewer having a plurality of viewer lines having a second set of physical characteristics related to said first set of physical set of physical characteristics.

14. The method of claim 13 further comprising adjusting the relative positions of said sets of parallel lines within a security element to insure that a substantial portion of said lines of said sets intersect each other.

15. The method of claim 14 wherein said first and second set of parallel lines are perpendicular to each other.

16. A system for generating a secure webpage comprising:
generating a plain webpage; and
incorporating in said plain webpage a security image including a plurality of security elements, each security element being formed of two sets of parallel lines, each set of parallel lines consisting of adjacent lines, with the lines of said sets not being parallel with the lines of the other set, each element corresponding to an alphanumeric character to form a modified webpage, wherein said security image defines customer-selected data.

17. The system of claim 1 wherein said parallel lines have physical characteristics selected to render said security image substantially visible only when viewed through a dedicated viewer.

18. The system of claim 17 wherein the viewer has viewer lines having physical characteristics dependent on the physical characteristics of the lines forming the security image.

19. The system of claim 17 wherein said physical characteristics include at least one of line thickness and line density.

20. The system of claim 1 wherein said first and second set of lines are perpendicular.

21. The system of claim 1 wherein said security image generator is adapted to adjust the relative positions of adjacent security elements to insure that the first set of parallel lines of the adjacent security elements are continuous.

22. An apparatus for generating security images electronically comprising:
an input receiving a request for a security image based on a plurality of graphic elements arranged in a row;
a security image generator coupled to said input, said security image generator being adapted to obtain from a library and assemble a plurality of security images arranged adjacent to each other, each security image being formed of at least two sets of parallel lines and corresponding to a respective graphic element of said request, each set of parallel lines consisting of adjacent parallel lines, the lines of one of said sets not being parallel with the lines of the other of said sets; and
an output providing said security image to a user.

23. The apparatus of claim 22 wherein said security elements include alphanumeric characters.

24. The apparatus of claim 22 further comprising said library.

25. The apparatus of claim 1 wherein within at least one of said security element some of the lines of one set meet and are continuous with some of the lines of the second set.

26. The apparatus of claim 1 wherein said first set of lines define an outline that corresponds at least in content to the respective graphic image and said second set of lines form a background for said outline in a manner selected to render said outline invisible as viewed by a naked eye.

* * * * *